United States Patent Office 3,429,942
Patented Feb. 25, 1969

1

3,429,942
QUENCHING TECHNIQUE FOR HYDRODEALKYL-
ATION OF ALKYL AROMATIC HYDROCARBON
Kenneth E. Nelson, Midland, Billy G. Kipfmiller, Bay
City, and Earl Parizek, Midland, Mich., assignors to The
Dow Chemical Company, Midland, Mich., a corpora-
tion of Delaware
Filed Oct. 16, 1967, Ser. No. 675,456
U.S. Cl. 260—672                                    14 Claims
Int. Cl. C07c 3/58, 3/40

ABSTRACT OF THE DISCLOSURE

Carbon or coke formation in a hydrotreating or hydro-
dealkylation reactor is reduced markedly by feeding
quench liquid in the direction of flow of hot reactor gases.
The quench liquid is fed directly into the base of the re-
actor, either into the outlet or a stand-pipe attached to the
outlet.

---

This invention relates to a method of hydrotreating
and/or hydrodealkylating alkylated aromatic hydrocar-
bons with a major reduction in carbon formation by react-
ing hydrogen and a crude benzene stream to purify the
benzene or hydrogen and alkylated aromatic hydrocar-
bons to convert the alkyl aromatic compounds to the un-
substituted aromatic hydrocarbons, and feeding a quench
liquid in the direction of flow of the hot reactor gases, and
to a reactor having a quench chamber in the outlet section
thereof. More particularly the invention pertains to a
method of hydrotreating and/or hydrodealkylating aro-
matic hydrocarbons and reducing markedly the deposition
of coke or carbon in the reactor by feeding into a cooling
section of the reactor, located adjacent the outlet thereof,
sufficient cooling liquid moving in the direction of flow
of the outlet gases to reduce the temperature to about
1200° F. or below and to a reactor design having a
cooling chamber with restricted dimensions located near
the outlet of the reactor and projecting into the reactor
and means for feeding a cooling liquid in the direction of
flow of the exiting hot vapors.

Hydrodealkylation or hydrotreating reactions wherein
a mixture of hydrogen and a crude benzene stream or hy-
drogen and alkylated aromatic compounds are reacted at
temperatures of 1100–1600° F. or slightly higher are
known. These reactions can be effected either in the pres-
ence or absence of catalyst. In either case one of the
major problems is the formation of carbon during the de-
alkylating step. This carbon formation in catalytic proc-
esses, requires stopping the reaction periodically, and
either burning the carbon from the catalyst surface with
preheated air or reacting the carbon with high tempera-
ture steam with or without added air to form some CO
and $H_2$. In non-catalytic systems carbon mounds gen-
erally tend to form along the walls at the base of the reac-
tor. Even if the opening in the reactor base remains open,
carbon flakes will in time tend to plug up heat exchangers
and screens on the down stream side. The amount of car-
bon deposited in the reactor amounts to about 20–25%
of its total volume. This, of course, necessitates a shut
down and a major cleaning effort to bring the reactor and
its complementary down stream components back into
operating condition.

It has now been found that if a cooling or quench liquid
is fed in the direction of flow of the effluent gases into the
reactor outlet or into a stand-pipe at the base or outlet
of the reactor, the coking or carbon formation in the re-
actor is greatly reduced. The reason for this improve-
ment is not definitely known, but it is believed that feed-
ing the liquid into the stand-pipe or reactor outlet in the
direction of flow of the hot gases results in a venturi

2 effect, so that hot vapors of the organic materials in
the reactor tend to draw away from its walls and flow
through the outlet without appreciable cracking and de-
composition. This improvement in reducing carbon forma-
tion is particularly noticeable in a vapor phase non-cata-
lytic hydrodealkylation of alkylated aromatic hydrocar-
bons at temperatures of 1100 to about 1500° F.

Figure 1:
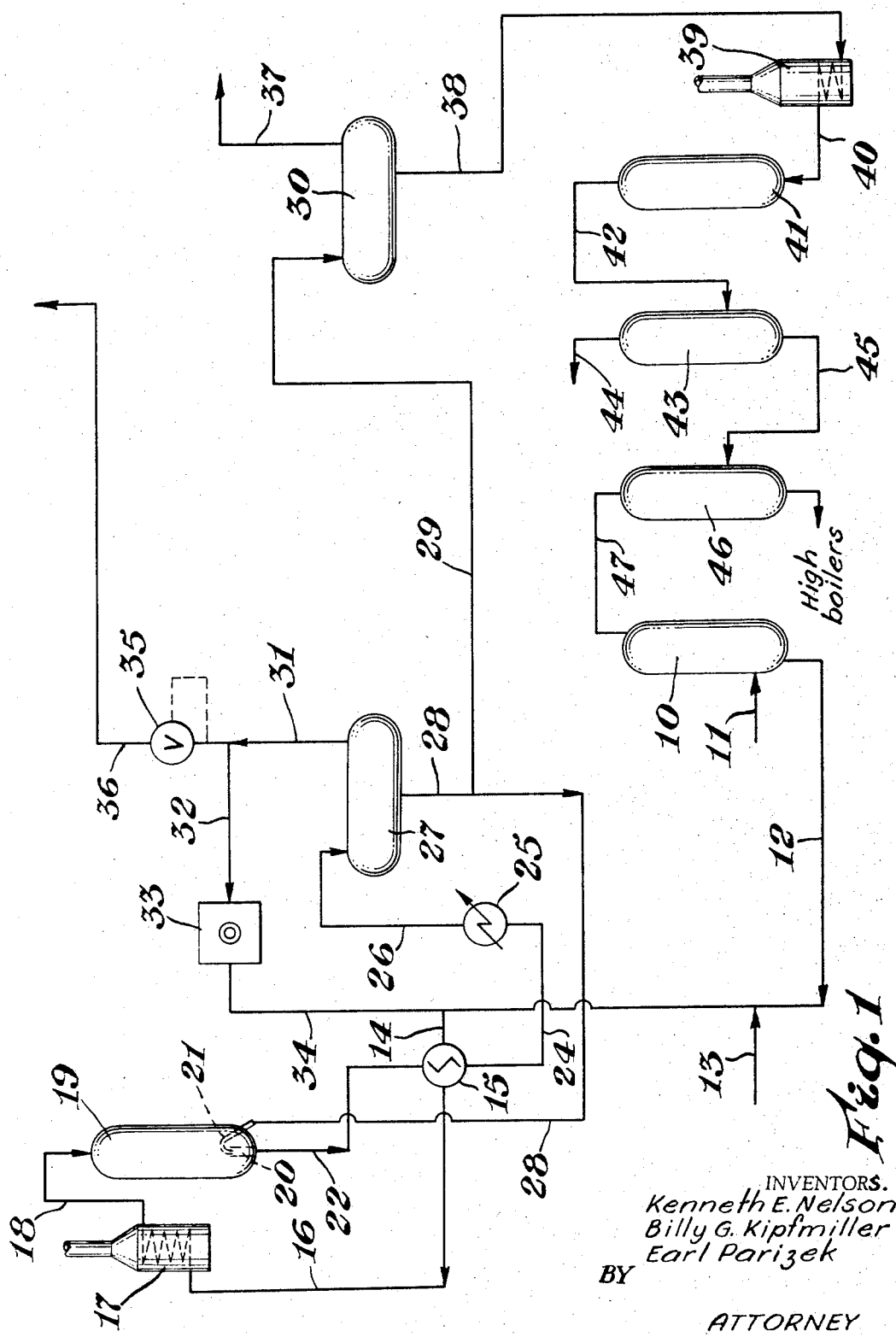
FIG. 1 is a flow diagram of the hydrodealkylation
process of this invention.

The hydrodealkylation reaction can be represented
graphically by the following formula:

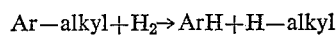

wherein Ar represents an aromatic radical.

Representative aromatic compounds which can be de-
alkylated include toluene, the xylenes, tri and tetramethyl
benzenes, ethyl benzene, diethylbenzene, fused alkyl sub-
stituted aromatic compounds, such as methyl, dimethyl,
trimethyl or tetramethyl naphthalenes, ethyl and diethyl
naphthalenes. When the aromatic compound contains one
or more alkyl groups having two or more carbon atoms, it
may be necessary to recycle a portion of such aromatic
hydrocarbon to dealkylate it completely, because there is
some indication that at least a portion of the alkyl groups
with two or more carbon atoms attached to the aromatic
ring are dealkylated in steps whereby small carbon chains
are split off from the alkyl portion of the molecule. Usual-
ly when multicarbon alkyl groups are removed from an
aromatic ring, an appreciable amount of methane is
formed.

The preferred alkylated aromatic hydrocarbons sub-
jected to dealkylation are those containing a total of 1
to about 4 C atoms in the alkyl groups. Most preferred
are toluene and xylenes and mixtures thereof.

For the purposes of brevity the term "hydro-treating"
as used herein refers to a method of purifying a crude
benzene stream by feeding such stream together with hy-
drogen to a preheater and then through a reactor at 1100–
1500° F. The crude benzene can contain up to about
20% by volume of other hydrocarbons which have boil-
ing points close to benzene, so that they cannot be readily
removed by fractionation. Also crude $C_6$ cuts from a de-
sulfurization and hydrogenation step can be used. Typical
of the impurities are hexene, hexane, cyclopentene, cyclo-
pentane, cyclohexene, cyclohexane, heptene, heptane,
methyl cyclopentane, dimethyl cyclopentane, methyl cy-
clohexane, octane, toluene, xylenes, ethyl benzene and
small amounts of heavier aromatics or heavier paraffins.

In the reaction the aliphatic and cycloaliphatic hydro-
carbons are converted to lower alkyl hydrocarbons of
from 1 to about 3 C atoms which are gaseous at room
temperature. The alkylated aromatics are either com-
pletely dealkylated to benzene or partially dealkylated
to lower molecular weight alkyl aromatics.

The hydrogen is used in stoichiometric excess. Pref-
erably, the molar ratio of $H_2$ per alkyl carbon atom non-
aromatic benzene contaminants on the aromatic ring
ranges from 1.5 to about 8.

The hydrogen need not be pure. In fact, recycle hy-
drogen containing about 40–60% by volume $H_2$ and
40–60% by volume of a lower alkane, such a methane
or ethane, or mixtures thereof can be used effectively.

The temperature in the reactor can range from about
1150 to about 1500° F. In the preferred non-catalytic pro-
cedure, there is little or no reaction between the non-
aromatic hydrocarbons or hydrodealkylation of aromatics
at temperatures below about 1100° F. Good conversions
of toluenes and xylenes and mixtures thereof are obtained at temperatures of 1200–1400° F. and are therefore preferred.

The pressure in the reactor can range from 200 to 1000 p.s.i.g., preferably 300 to 600 p.s.i.g.

The residence or reaction time is estimated to be 10 to 40 seconds in the examples, but residence times up to 60 seconds are operable.

It is essential to quench the reaction by reducing the temperature of the gases leaving the reactor. For this purpose, a quench or cooling liquid, which can be recycle liquid or any comparatively high boiling liquid which is not decomposed appreciably by a short period of exposure to temperatures of 1150–1600° F., is sprayed or pumped into the reactor outlet or a stand-pipe attached to the reactor outlet without permitting appreciable amounts of the liquid to come into contact with the hot reactor walls. The quantity of quench liquid should be sufficient to cool the gases to 1200° F. or below. It is believed that this produces a venturi effect which draws the hot vapors away from the reactor walls at the base thereof and aids in leading such vapors into the cooling or quenching zone in the reaction outlet. The reacted mixture at 1200° F. or below is passed through one or more indirect heat exchangers to cool the mixtures below the liquefaction temperature of the aromatic compounds at the pressure employed. At pressures of 300–600 p.s.i.g the liquefaction temperature of benzene is about 440–530° F. After liquefaction the products are separated, as will be hereafter described.

Referring to FIG. 1, a procedure for hydrodealkylating a mixed stream containing about 85 volume percent toluene, 10% xylenes and ethyl benzene and 5% paraffins is described. The mixture is fed into reservoir 10 through line 11. The mixture of alkylated hydrocarbons is removed from reservoir 10 through line 12 at about room temperature. Make-up hydrogen, containing from 0–20% $CH_4$, under a pressure of about 500–600 p.s.i.g. is fed through line 13 into line 12. The mixture of liquid alkylated hydrocarbons and hydrogen gas is fed through line 14, to heat exchanger 15 where the gas-liquid mixture is preheated by exchange with reactor effluent. The alkylated hydrocarbon-hydrogen gas mixture is then passed through line 16 into a furnace 17, where the alkylated aromatic compounds-hydrogen mixture is heated to a temperature of 1150–1300° F. From the furnace the heated mixture passes through line 18, into reactor 19 where the exothermic hydrodealkylation reaction is continued, and the temperature is maintained at about 1200–1500° F. The dwell or reaction time in the reactor can range from about 10 to 40 seconds. The inner walls of the reactor can be stainless steel or a ceramic lined metal shell.

The hydrodealkylation reaction was carried out at pressures ranging from about 300 p.s.i.g. to about 600 p.s.i.g. which was the upper safe limit of the reactor design.

Figure 2:
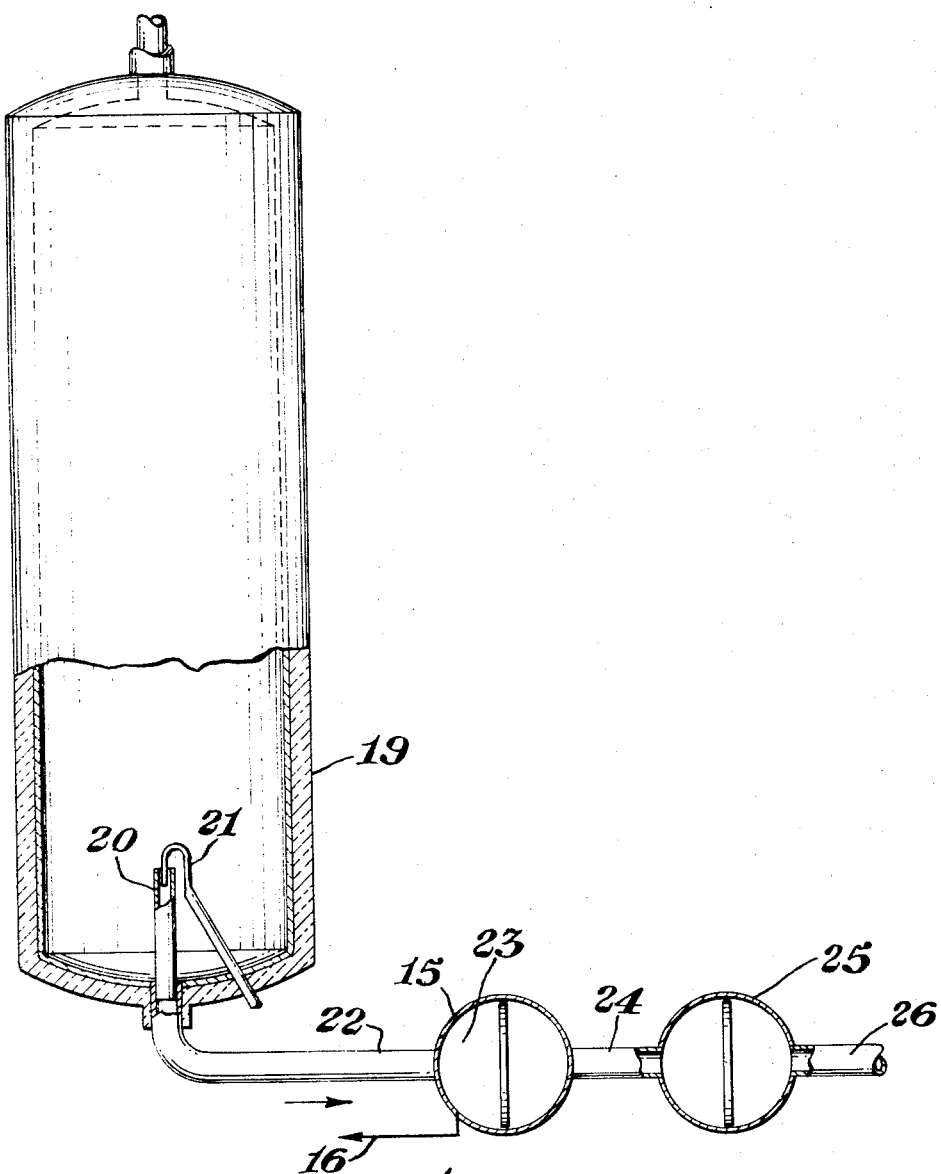
FIG. 2 shows a vertical section of a hydrodealkylation
reactor with a stand-pipe at its base and a quench liquid
conduit extending into the stand-pipe.

Referring now to FIG. 2, the hot reaction mixture which is at a temperature of 1200–1500° F. passes into stand-pipe 20 which in this instance was approximately 4 feet long and 8 inches in diameter. A line 21 of about 1 inch diameter for carrying quench liquid into the stand-pipe 20, projected through the walls of the reactor, over the stand-pipe and downwardly for a distance about 10 inches into the stand-pipe. Thus, when quench liquid was pumped into the stand-pipe the liquid flow was in the direction of the hot gases emerging from the reactor. In this portion of the reactor the quench liquid was supplied in sufficient quantity to lower the temperature of the gases to 1150 to 1200° F.

The stand-pipe 20 is connected to line 22 which leads to the inlet side 23 of heat exchanger 15.

It is to be understood that a stand-pipe is desirable but not absolutely essential. Similar results are obtainable by feeding quench liquid directly into line 22 in the direction of flow of the hot gases.

The partially cooled mixture leaves heat exchanger 15 through line 24 and enters a second heat exchanger 25, where the aromatic hydrocarbons are liquefied. From heat exchanger 25, the liquid-gas mixture passes through line 26 (see FIG. 1) to a high pressure separator 27, which operates at 300–600 p.s.i.g. It is to be understood that the number or type of heat exchangers are not particularly critical so long as the effluent gases are liquefied by the time they reach the high pressure separator.

A portion of the liquid from separator 27, is recycled through line 28, as the quench liquid mentioned above. It is to be undestood, however, that any other high boiling, stable quench liquid can be employed in place of the recycle stream.

The major portion of the liquid from separator 27 passes through line 29, a pressure reducer (not shown) to low pressure separator 30, where a pressure of 1–10 p.s.i.g. is maintained.

The vapor from high pressure separator 27 contains 40–65% by volume of hydrogen and the remainder is essentially methane and some gaseous low molecular weight hydrocarbons. Most of the vapors pass through lines 31, 32 to compressor 33 from which they are fed back to the reactor through lines 34 and 14. Vapors from high pressure separator 27 which are not recycled pass through pressure control valve 35 and into line 36. It desired, the gases in line 36 can be passed into a demethanizer (not shown) and the partially demethanized hydrogen can be returned to the reaction system through line 13.

The vapors from low pressure separator 30 are drawn through line 37 and vented or used as fuel.

The liquid from the low pressure separator passes through line 38 to a heater 39, through line 40 through clay tower 41, which removes traces of unsaturated hydrocarbons, through line 42, to a benzene distillation column 43. Benzene of 99.9% or higher purity is removed as vapor through line 44, and bottoms from the benzene distillation column are fed through line 45, to the toluene column 46. The overhead from column 46 is fed to reservoir 10 through line 47 for recycle. Bottoms or high boilers from column 46 can be burned as fuel.

Instead of the feed mixture described above, the ingredients entering the system through line 13 can contain 100% toluene, or 100% xylenes or any proportion of toluene, xylenes and other alkylated monocyclic aromatic hydrocarbons containing up to 4 C atoms, and up to 10% by volume of aliphatic hydrocarbons. In addition, hydrocarbon cuts containing a high proportion of benzene, even as high as 80% by volume, and 20% or more toluene, xylenes, ethyl benzenes and mixtures of the latter can be fed into the reactor to hydrodealkylate the alkylated aromatics.

A representative crude benzene stream contains about .6 weight percent 3-methyl pentane, 2.0% hexane, 1.2% cyclopentane, 3.6% methyl cyclopentane, 0.5% dimethyl cyclopentane, 1.3% cyclohexane, 1.4% methyl cyclohexane, .2% octane, about 0.6% higher aliphatics and the remainder benzene.

It is of course possible to run the hydrodealkylation with a benzene-toluene-xylene cut by removing the benzene as above described and then blending a $C_6$–$C_7$ cut or a $C_7$ stream from a petroleum cracking operation with the toluene-xylene mixture from the toluene column. The mixture of alkylated hydrocarbons is then run through the hydrodealkylation steps mentioned above.

Example 1

In a typical run using a mixture of 99 volume percent toluene and 1% xylenes, a feed ratio of about 1 mole of hydrocarbon per mole of make-up hydrogen, of 80–95% by volume $H_2$ purity were charged to the reactor 19 at a pressure of about 500–600 p.s.i.g. The temperature of the mixture after heating in the furnace 17 ranged from 1200–1250° F. The temperature in the reactor ranged from 1280 to 1340° F., and the reactor pressure ranged from 500 to 600 p.s.i.g. Recycle liquid from the high pressure separator 27 was injected into the stand-pipe 20 in the reactor under a pressure of about 500 to 600 p.s.i.g. The quench liquid was used in sufficient quantity to reduce the temperature of the reactor effluent to 1200° F. or slightly below. The mixture was cooled and fed to the high pressure separator 27 where a pressure of about 500–580 p.s.i.g. was maintained. The low pressure separator 30 was maintained at 1 to 5 p.s.i.g. Gas from the high pressure separator at a rate of about 4 moles of $H_2$ per mole of toluene was passed through compressor 33 and fed into the liquid-gas mixture as it entered heat exchanger 15. The hydrogen purity was about 55 volume percent. The gases from the low pressure separator 30 were vented and used as fuel.

Liquid from the low pressure separator was passed through line 38 to the heater 39 where a temperature of 350° F. was reached before entry into clay tower 41. From the clay tower the mixture was passed to benzene distillation column 43 where 99.9% or higher purity benzene was recovered. Bottoms from the column were fed to the toluene column 46. Unreacted toluene was taken off overhead and recycled. The heavies separated as bottoms from the toluene column were used as fuel.

Example 2

In this run a procedure in which a crude $C_6$–$C_7$ cut is fed to the reactor is described. It contained about 50 weight percent benzene, 32.1% toluene, 4.6% xylenes, 3.6% ethyl benzene, 4.7% aliphatic and cycloaliphatic hydrocarbons of the type described above and the remainder were heavy aromatic and aliphatic hydrocarbons.

The mixture was fed into line 12 and blended with 2.9 moles of $H_2$, of 80–95% purity, per mole of toluene in the hydrocarbon mixture. The pressure in the feed lines 12, 13, 14, and 16 and reactor 19 ranged from 500–600 p.s.i.g. and the temperature in the reactor ranged from 1200–1350° F. Recycle liquid from the high pressure separator 27 was fed through line 28 and injected into the stand-pipe 21 in sufficient quantity to reduce the temperature of reactor effluent to about 1200° F. Recycle hydrogen of about 40% purity at a ratio of about 8.4 moles per mole of toluene was fed into lines 34 and blended with the hydrocarbons in line 14.

The effluent which was cooled to liquefy the aromatics was fed through lines 22, and 24 and 26 to the high pressure separator 27 at 500–580 p.s.i.g. The low pressure separator 30 was maintained at 1 to 5 p.s.i.g.

Liquid from the low pressure separator was passed through line 38 to heater 39 where a temperature of 350° F. was reached before entry into clay tower 41. From the clay tower the mixture was passed to benzene distillation column 43 where 99.9% or higher purity benzene was removed from line 44. Bottoms from column 43 were fed to toluene column 46 through line 45. Unreacted toluene, xylenes and ethyl benzene were taken off overhead, passed through line 47 into reservoir 10 and recycled. The high boilers were used as fuel.

It is to be understood that crude benzene streams substantially devoid of alkylated monocyclic aromatic hydrocarbons can also be purified by converting the aliphatic and alicyclic hydrocarbons to lower molecular weight products which are gaseous at room temperature by using the procedural steps described above.

Alkylated polycyclic aromatic hydrocarbons can be dealkylated and recovered by the same procedural steps described above.

Example 3

The hydrodealkylation reaction operated according to this invention permits running with little or no coking.

Other runs made with $C_6$–$C_7$ streams containing up to 10% paraffinic hydrocarbons were made without appreciable carbon formation in the reactor.

In comparative studies where a splash plate 4 feet in diameter and 2 feet high was employed with a spray ring for supplying the quench liquid, which was a recycle stream from the high pressure separator, at feed rates approximately those mentioned in the examples, serious coking was evident within four weeks. In one such four week period 1600 pounds of coke were formed in the reactor. This required shut down and digging out the carbon from the reactor.

If used, the length of stand-pipe 20 in reactor 19 can vary from about 1 to about 50% of the reactor height and the diameter of the stand-pipe can range from about 8 to about 20% of that of the reactor. The quench feed 21 can project into the stand-pipe 20 for any distance ranging from 3″ below the stand-pipe surface to a position below the reactor base.

We claim:

1. A method of treating a hydrocarbon stream containing aromatic hydrocarbons comprising passing hydrogen and a stream consisting essentially of at least one of (A) alkylated aromatic hydrocarbons having a total of from 1 to 4 C atoms in the alkyl groups, (B) benzene contaminated with up to 20 volume percent of aliphatic and alicyclic hydrocarbons, (C) mixtures of alkylated benzenes, benzene, aliphatic and alicyclic hydrocarbons, and (D) mixtures of benzene and alkylated benzenes having 1 to 4 C atoms in the alkyl groups, in a molar ratio of 1.5 to 8.4 moles $H_2$ per mole of hydrocarbon into a reaction zone at a temperature of from about 1100–1600° F., feeding a quench liquid in the direction of flow of hot effluent gases into the outlet portion of said reactor, at a rate sufficient to reduce the temperature of the effluent gases to about 1200° F. or below and sufficient to draw hot vapors away from the reactor wall to thereby avoid appreciable cracking and decomposition of organic materials, further cooling said reactor effluent to form a liquid and a gas phase and separating the unsubstituted aromatic hydrocarbons from said liquid phase.

2. The method of claim 1 in which the hydrocarbons fed into the reactor are alkylated aromatic hydrocarbons having a total of from 1 to 4 C atoms in the alkyl groups.

3. The method of claim 1 in which the hydrocarbon fed to the reactor is benzene contaminated with up to 20 volume percent of aliphatic and alicyclic compounds boiling near the boiling point of benzene.

4. The method of claim 1 in which the hydrocarbon fed to the reactor is a mixture of benzene, alkylated benzenes in which the alkyl groups have a total of 1–4 C atoms.

5. The method of claim 1 in which the hydrocarbon fed to the reactor is a mixture of benzene and alkylated benzenes having 1 to 4 C atoms in the alkyl groups.

6. The method of claim 1 in which the reaction is non-catalytic.

7. The method of claim 1 in which the quench liquid is liquid condensate from the reaction.

8. The method of claim 2 in which the alkylated aromatic compounds subjected to dealkylation are alkylated monocyclic aromatic compounds and the product recovered is benzene.

9. The method of claim 8 in which the alkylated aromatic compounds are toluene, xylene and mixtures thereof.

10. The method of claim 1 in which hot effluent gases pass into a stand-pipe located above and contiguous to the outlet from the reactor and quench liquid is fed into the stand-pipe below the top thereof at a rate sufficient to cool the reaction effluent below about 1200° F.

11. In a reactor useful for hydrodealkylating aromatic hydrocarbons and made of high temperature resistant material comprising an inlet for reactants in the upper portion of said reactor, a stand-pipe situated in the outlet at the base of the reactor, and extending upwardly from said base for a distance of 1 to 50% of the reactor height, said stand-pipe being 8 to 20% of the reactor diameter, and means for supplying a quench liquid into said stand-pipe in the direction of flow of the hot reactor gas effluent.

12. The reactor of claim 11 in which the reactor has a height of about 22 feet and the stand-pipe is about 4 feet high and 8 inches in diameter.

13. The structure of claim 12 in which the quench liquid delivery means is a 1 inch diameter line extending downwardly into the stand-pipe a distance of at least 3 inches.

14. The structure of claim 12 wherein the reactor, and the stand-pipe and quench liquid delivery means are made of stainless steel.

References Cited

UNITED STATES PATENTS

| | | | |
|---|---|---|---|
| 2,776,727 | 1/1957 | Boisture | 183—82 |
| 2,791,549 | 5/1957 | Jahnig | 196—55 |
| 3,133,014 | 5/1964 | Cross | 208—348 |
| 3,154,385 | 10/1964 | Jacobs et al. | 23—284 |
| 3,174,924 | 3/1965 | Clark et al. | 208—48 |
| 3,256,357 | 6/1966 | Baumann et al. | 260—672 |
| 3,288,876 | 11/1966 | Hammond et al. | 260—672 |
| 3,291,849 | 12/1966 | King et al. | 260—672 |
| 3,322,647 | 5/1967 | Calaway | 196—140 |

DELBERT E. GANTZ, *Primary Examiner.*

G. E. SCHMITKONS, *Assistant Examiner.*

U.S. Cl. X.R.

23—284; 48—93, 213